(12) United States Patent
Kwak et al.

(10) Patent No.: US 9,258,090 B2
(45) Date of Patent: Feb. 9, 2016

(54) METHODS AND APPARATUS FOR TRANSMITTING AND RECEIVING SIGNAL BY USING MODULATION ORDER OF INTERFERENCE SIGNAL

(71) Applicant: Samsung Electronics Co., Ltd., Gyeonggi-do (KR)

(72) Inventors: Yongjun Kwak, Gyeonggi-do (KR); Younsun Kim, Gyeonggi-do (KR); Hyojin Lee, Gyeonggi-do (KR); Juho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 69 days.

(21) Appl. No.: 14/206,704

(22) Filed: Mar. 12, 2014

(65) Prior Publication Data

US 2014/0274085 A1    Sep. 18, 2014

(30) Foreign Application Priority Data

Mar. 12, 2013 (KR) .......... 10-2013-0026147

(51) Int. Cl.
*H04B 1/00* (2006.01)
*H04L 5/00* (2006.01)
*H04L 27/00* (2006.01)

(52) U.S. Cl.
CPC ............ *H04L 5/0037* (2013.01); *H04L 5/0073* (2013.01); *H04L 5/0046* (2013.01); *H04L 5/0048* (2013.01); *H04L 5/0091* (2013.01); *H04L 27/0012* (2013.01)

(58) Field of Classification Search
CPC ....... H04L 5/0073; H04L 1/0026; H04L 1/00; H04L 5/0007; H04L 1/0003; H04L 25/0328; H04L 25/0202; H04W 72/082; H04W 52/243; H04J 11/005; H04J 11/004; H04J 11/0023; H04B 1/7107; H04B 15/00
See application file for complete search history.

(56) References Cited

U.S. PATENT DOCUMENTS

| | | | | |
|---|---|---|---|---|
| 9,078,151 | B2 * | 7/2015 | Lee ........................ | H04W 24/02 |
| 2014/0126404 | A1 * | 5/2014 | Kim et al. ............. | H04W 24/02 |
| | | | | 370/252 |
| 2014/0321521 | A1 * | 10/2014 | Lee ....................... | H04W 24/02 |
| | | | | 375/227 |

* cited by examiner

*Primary Examiner* — Ronald Eisner
(74) *Attorney, Agent, or Firm* — The Farrell Law Firm, P.C.

(57) ABSTRACT

Methods and apparatus are provided for receiving a serving signal from a base station by a user equipment. A signal that includes the serving signal and an interference signal is received. A Log Likelihood Ratio (LLR) of the received signal is calculated according to each of a plurality of modulation orders applicable to the interference signal to obtain a plurality of LLR values. A modulation order of the interference signal is determined, based on the plurality of LLR values. The serving signal is reconstructed, based on the determined modulation order.

14 Claims, 17 Drawing Sheets

METHODS AND APPARATUS FOR TRANSMITTING AND RECEIVING SIGNAL BY USING MODULATION ORDER OF INTERFERENCE SIGNAL

PRIORITY

This application claims priority under 35 U.S.C. §119(a) to Korean Patent Application No. 10-2013-0026147, filed on Mar. 12, 2013, which is incorporated herein by reference.

BACKGROUND OF THE INVENTION

1. Field of the Invention

The present invention relates generally to a method and an apparatus for transmitting and receiving a signal by using the modulation order of an interference signal, and more particularly, to a method and apparatus for determining the modulation order of an interference signal included in a signal, received by a user equipment from a base station, and for using the determined modulation order for signal reconstruction.

2. Description of the Related Art

In general, a cellular wireless mobile communication system is implemented by establishing a plurality of cells in a limited area. In each cell, base station equipment, which is exclusively responsible for mobile communication in the corresponding cell, is located in the middle of the cell area. The base station equipment includes an antenna, through which a wireless signal is transmitted, and a signal processing part. The base station equipment provides mobile communication services to user equipments within the corresponding cell. Such a system in which an antenna is provided in the middle of a cell is referred to as a Centralized Antenna System (CAS), and a typical mobile communication system corresponds to this type of system.

A Distributed Antenna System (DAS) can provide improved mobile communication services over the CAS by evenly distributing antennas in the service area of a cell. For efficient communication in the DAS, where antennas are located in a distributed manner in the area covered by each base station, interference aware communication, interference cancellation communication, or the like, may be employed using an advanced receiver.

When a base station transmits direct signaling information on the modulation order of an interference signal to an advanced receiver, there is a problem in that signaling overhead increases as the number of interference signals increases, which leads to a deterioration of system performance.

SUMMARY OF THE INVENTION

The present invention has been made to address at least the above problems and/or disadvantages and to provide at least the advantages described below. Accordingly, an aspect of the present invention provides a method and an apparatus that can efficiently become aware of or cancel interference, without receiving a direct indication of the modulation order of an interference signal, by an advanced receiver for interference aware communication or interference cancellation communication.

In accordance with an embodiment of the present invention, a method is provided for receiving a serving signal from a base station by a user equipment. A signal that includes the serving signal and an interference signal is received. A Log Likelihood Ratio (LLR) of the received signal is calculated according to each of a plurality of modulation orders applicable to the interference signal to obtain a plurality of LLR values. A modulation order of the interference signal is determined, based on the plurality of LLR values. The serving signal is reconstructed, based on the determined modulation order.

In accordance with another embodiment of the present invention, a method is provided for receiving a serving signal from a base station by a user equipment. Modulation order information for determining a modulation order of an interference signal is received from the base station. A signal that includes the serving signal and the interference signal is received from the base station. The modulation order of the interference signal is determined, based on the modulation order information. The serving signal is reconstructed based on the determined modulation order.

In accordance with yet another embodiment of the present invention, a method is provided for transmitting a serving signal to a User Equipment (UE) by a base station. Modulation order information for determining a modulation order of an interference signal is generated. The serving signal is transmitted with the modulation order information in a resource allocated to the UE.

In accordance with still yet another embodiment of the present invention, a user equipment is provided that receives a serving signal. The user equipment includes a receiver that receives a signal that includes the serving signal and an interference signal. The user equipment also includes an LLR calculator that calculates an LLR of the received signal according to each of a plurality of modulation orders applicable to the interference signal to obtain a plurality of LLR values. The user equipment additionally includes a modulation order determiner that determines a modulation order of the interference signal, based on the plurality of LLR values. The user equipment further includes a signal reconstructor that reconstructs the serving signal, based on the determined modulation order.

In accordance with still yet another embodiment of the present invention, a user equipment is provided that receives a serving signal from a base station. The user equipment includes a receiver that receives modulation order information for determining a modulation order of an interference signal, and a signal that includes the serving signal and the interference signal, from the base station. The user equipment also includes a controller that determines the modulation order of the interference signal, based on the modulation order information. The user equipment further includes a signal reconstructor that reconstructs the serving signal, based on the determined modulation order.

In accordance with still yet another embodiment of the present invention, a base station is provided that transmits a serving signal to a UE. The base station includes: a controller that generates modulation order information for determining a modulation order of an interference signal. The base station also includes a transmitter that transmits the serving signal with the modulation order information in a resource allocated to the UE.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
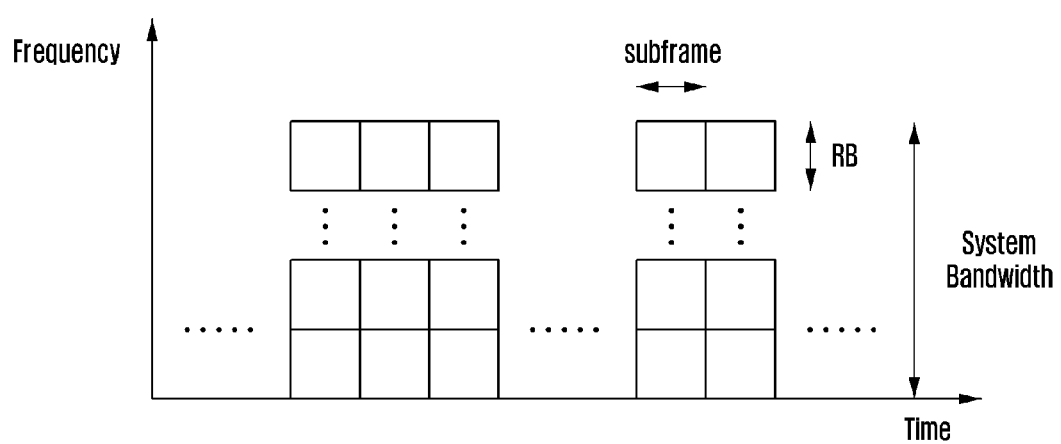
FIG. 1 is a diagram illustrating a time-frequency resource in an Long Term Evolution (LTE)/LTE-Advanced (LTE-A) system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Further, described terms are defined in consideration of the functions of the present invention, but may vary according to the intention or convention of a user or operator. Therefore, definitions need to be determined based on the overall content of the present specification.

Further, although the following description of embodiments of the present invention is directed to a wireless communication system based on Orthogonal Frequency Division Multiplexing (OFDM), especially the $3^{rd}$ Generation Partnership Project (3GPP) Evolved Universal Terrestrial Radio Access (3GPP EUTRA) standard, it can be understood by those skilled in the art that the present invention may also be applied to any other communication system having a similar technical background and channel format, with a slight modification, without substantially departing from the scope of the present invention.

From the early stage of providing voice-oriented services, a mobile communication system has evolved into a high-speed, high-quality wireless packet data communication system that provides data and multimedia services. Various mobile communication standards such as, for example, High Speed Downlink Packet Access (HSDPA) and High Speed Uplink Packet Access (HSUPA), LTE, LTE-A, High Rate Packet Data (HRPD) of the $3^{rd}$ Generation Partnership Project-2 (3GPP2), and Institute of Electrical and Electronics Engineers (IEEE) 802.16, have recently been developed to support high-speed, high-quality wireless packet data communication services. In particular, the LTE system, which is a system developed to efficiently support high speed wireless packet data transmission, maximizes wireless system capacity by using various wireless access technologies. The LTE-A system, which is an advanced wireless system evolved from the LTE system, has enhanced data transmission capability as compared to the LTE system.

In general, LTE refers to base station equipment and UE devices corresponding to Release 8 or 9 of the 3GPP standard organization, and LTE-A refers to base station equipment and UE devices corresponding to Release 10 of the 3GPP standard organization. The 3GPP standard organization has standardized the LTE-A system and is now discussing the standard for a subsequent Release with improved performance, based on the standardized LTE-A system.

The existing $3^{rd}$ Generation (3G) and $4^{th}$ Generation (4G) wireless packet data communication systems such as, for example, HSDPA, HSUPA, HRPD, and LTE/LTE-A, employ an Adaptive Modulation and Coding (AMC) scheme, a channel-sensitive scheduling scheme, and the like, to improve transmission efficiency.

When the AMC scheme is employed, a transmitter can adjust the amount of transmission data depending on a given channel state. Specifically, when a channel state is poor, a transmitter can adjust a reception error probability to a desired level by reducing the amount of transmission data, and when a channel state is good, the transmitter can efficiently transmit a large amount of information while adjusting a reception error probability to a desired level by increasing the amount of transmission data. Further, when a resource management method based on the channel-sensitive scheduling scheme is employed, a transmitter can selectively provide a service to a user with a good channel state among a plurality of users, resulting in an increased system capacity as compared to when the transmitter assigns a channel to one user and provides a service to the user to whom the channel is assigned.

Such a capacity increase is referred to as a multi-user diversity gain. In short, the AMC scheme and the channel-sensitive scheduling scheme are methods that allow a transmitter to apply an appropriate modulation and coding technique at a point of time that is determined to be most efficient based on partial channel state information fed back from a receiver.

The AMC scheme, when used with a Multiple Input Multiple Output (MIMO) transmission scheme, may also include a function of determining the number of spatial layers for a transmission signal, i.e., a rank. The AMC scheme determines an optimal data rate in consideration of not only a coding rate and a modulation scheme, but also the number of layers for transmission using MIMO.

The MIMO scheme in which a wireless signal is transmitted using a plurality of transmission antennas may be classified into Single User-MIMO (SU-MIMO) for transmission to one UE and MultiUser-MIMO (MU-MIMO) for transmission to a plurality of UEs using the same time-frequency resource. In the case of SU-MIMO, a plurality of transmission antennas transmits wireless signals to a plurality of spatial layers for one receiver. In order to support the plurality of spatial layers, the receiver has to be equipped with a plurality of reception antennas.

Contrarily, in the case of MU-MIMO, a plurality of transmission antennas transmits wireless signals to a plurality of spatial layers for a plurality of receivers. The MU-MIMO is advantageous over the SU-MIMO in that a receiver does not require a plurality of reception antennas. However, the MU-MIMO has a disadvantage in that since wireless signals are transmitted to a plurality of receivers in the same frequency and time resource, interference may occur between the wireless signals for different receivers.

In recent years, research has been actively conducted to replace Code Division Multiple Access (CDMA), which is a multiple access scheme used in the 2G and 3G mobile communication systems, by Orthogonal Frequency Division Multiple Access (OFDMA). Both 3GPP and 3GPP2 have started standardization work on an evolved systems employing OFDMA. It is known that the OFDMA scheme may be expected to increase capacity when compared to the CDMA scheme.

One of several factors for the capacity increase in the OFDMA scheme is the capability to perform scheduling on the frequency axis (frequency domain scheduling). In the same manner as the channel-sensitive scheduling scheme in which a capacity gain is achieved according to the time-varying characteristic of a channel, it is possible to achieve more capacity gain by using the frequency-varying characteristic of a channel.

FIG. 1 illustrates a time-frequency resource in an LTE/LTE-A system.

Referring to FIG. 1, a radio resource for transmission from an evolved Node B (eNB) to a UE is divided into frequency resource units called RBs on the frequency axis, and into time resource units called sub-frames on the time axis. A system bandwidth is determined depending on the number of RBs included in the radio resource. In the LTE/LTE-A system, an RB generally includes 12 subcarriers and has a band of 180 kHz. Further, in the LTE/LTE-A system, a sub-frame generally includes 14 OFDM symbol intervals and has a time duration of 1 msec. The LTE/LTE-A system may allocate resources for scheduling in units of sub-frames on the time axis and in units of RBs on the frequency axis.

Figure 2:
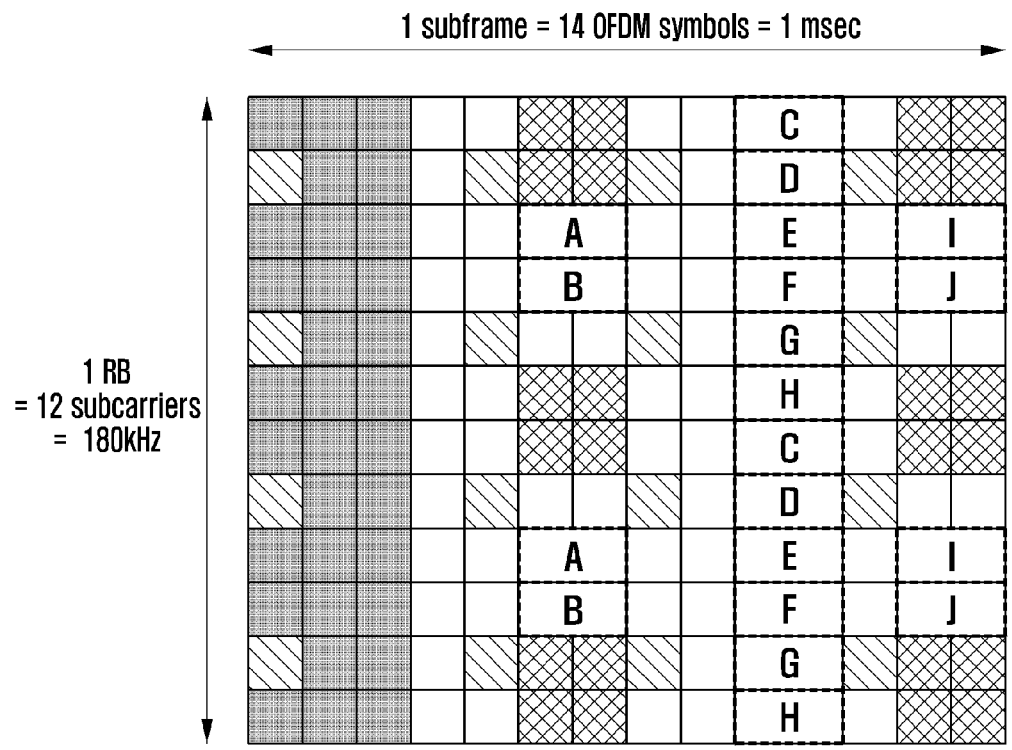
FIG. 2 is a diagram illustrating a radio resource corresponding to one sub-frame and one Resource Block (RB), which is the minimum unit of scheduling via a downlink in an LTE/LTE-A system.

FIG. 2 illustrates a radio resource corresponding to one sub-frame and one RB, which is the minimum unit of scheduling via a downlink in the LTE/LTE-A system.

The radio resource shown in FIG. 2 is of one sub-frame on the time axis and one RB on the frequency axis. As shown in FIG. 2, such a radio resource includes 12 subcarriers in the frequency domain and 14 OFDM symbols in the time domain, resulting in a total of 168 unique time-frequency positions. In the LTE/LTE-A system, each unique time-frequency position of FIG. 2 is referred to as a Resource Element (RE). Further, one sub-frame includes two slots, each including 7 OFDM symbols.

The following types of signals may be transmitted in the radio resource shown in FIG. 2.

1. Cell-specific Reference Signal (CRS): reference signal transmitted to all UEs belonging to one cell.
2. Demodulation Reference Signal (DMRS): reference signal transmitted to a specific UE.
3. Physical Downlink Shared Channel (PDSCH): data channel transmitted via a downlink, which is used by an eNB to transmit traffic to a UE, and is transmitted using an RE not used for reference signal transmission in the data region of FIG. 2.
4. Channel Status Information-Reference Signal (CSI-RS): reference signal transmitted to UEs belonging to one cell and used for channel state measurement. A plurality of CSI-RSs may be transmitted in one cell.
5. Other control channels (Physical HARQ Indicator Channel (PHICH), Physical Control Format Indicator Channel (PCFICH), Physical Downlink Control Channel (PDCCH), etc.): control channels for providing control information required for a UE to receive a PDSCH or transmitting Acknowledgement/Negative Acknowledgement (ACK/NACK) for operating Hybrid Automatic Repeat Request (HARQ) for uplink data transmission.

In addition to the above signals, muting may be set in order to allow CSI-RSs transmitted from other eNBs to be received by UEs in the corresponding cells without causing interference in the LTE-A system. Muting may be mapped to a position where a CSI-RS can be transmitted, and a UE generally skips the corresponding muted radio resource when receiving a traffic signal. In the LTE-A system, muting is also referred to as a zero-power CSI-RS. This is because, by nature, muting is mapped to a CSI-RS position and transmission power is not transmitted in the muting position.

In FIG. 2, CSI-RSs may be transmitted using some of the positions marked by "A", "B", "C", "D", "E", "F", "G", "H", "I", and "J", according to the number of antennas for CSI-RS transmission. Further, muting may also be mapped to some of the positions marked by "A", "B", "C", "D", "E", "F", "G", "H", "I", and "J".

In particular, CSI-RSs may be transmitted using 2, 4, or 8 REs, according to the number of transmission antenna ports. That is, half of the specific pattern in FIG. 2 is used for CSI-RS transmission when the number of antenna ports is 2, the entire specific pattern is used for CSI-RS transmission when the number of antenna ports is 4, and two patterns are used for CSI-RS transmission when the number of antenna ports is 8. Contrarily, muting is always mapped in units of patterns. That is, muting may be applied to a plurality of patterns, but cannot be applied to only a part of one pattern when muting positions do not overlap CSI-RS positions. Only when muting positions overlap CSI-RS positions, may muting be applied to a part of one pattern.

In a cellular system, a reference signal must be transmitted in order to measure a downlink channel state. In the case of the LTE-A system of the 3GPP, a UE measures a channel state between an eNB and the UE by using a CSI-RS transmitted by the eNB.

Basically, a channel state must be measured in consideration of several factors including downlink interference. Downlink interference includes thermal noise and interference signals caused by antennas belonging to neighbor eNBs, and is an important factor when a UE determines a downlink channel condition.

As an example, when an eNB with one transmission antenna transmits a reference signal to a UE with one reception antenna, the UE must determine energy per symbol receivable via a downlink and interference to be simultaneously received in the reception interval of the corresponding symbol from the reference signal received from the eNB. The UE must also calculate a Signal to Noise Plus Interference Ratio (SNIR), based on the determined energy and interference. The SINR corresponds to a value obtained by dividing the power of a received signal by the intensity of a noise plus interference signal. In general, a higher SNIR may result in better reception performance and a higher data rate. The determined SNIR, a value corresponding thereto, or the maximum data rate supportable at the determined SNIR, is reported to the eNB. Thus, the eNB can determine the data rate at which to transmit data to the UE via a downlink.

In a typical mobile communication system, base station equipment is placed in the middle of each cell to perform mobile communication with a UE by using one antenna or a plurality of antennas located in a limited site. Such a mobile communication system in which antennas belonging to one cell are located at the same position is referred to as a CAS. In contrast to this, a mobile communication system in which antennas (remote radio heads, (RRHs)) belonging to one cell are located at distributed positions in the cell is referred to as a DAS.

Figure 3:
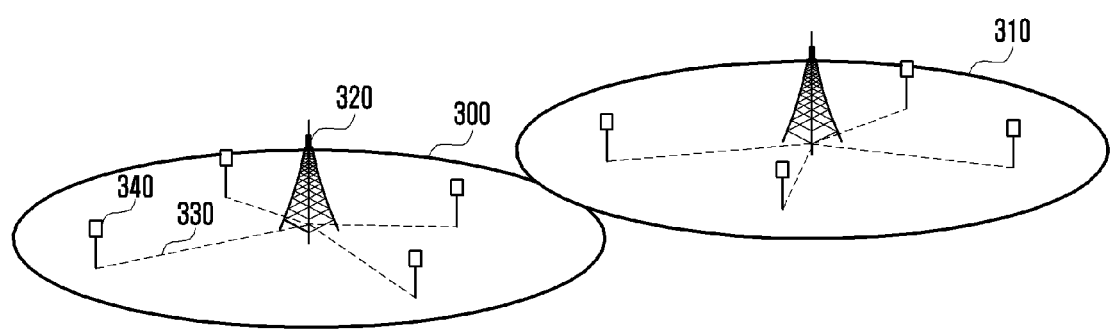
FIG. 3 is a diagram illustrating antennas located at distributed positions in a distributed antenna system.

FIG. 3 is a diagram illustrating antennas located at distributed positions in a distributed antenna system.

The system shown in FIG. 3 corresponds to a DAS including two cells 300, 310. The cell 300 is provided with one high power antenna 320 and four low power antennas 340. While the high power antenna 320 may provide at least minimum services over the entire cell area, the low power antennas 340 may provide high data rate-based services to limited UEs in limited areas within the cell. Further, the lower power antennas 340 and the high power antenna 320 are all connected to a central controller, as indicated by reference numeral 330, and are to be operated according to the scheduling and radio resource allocation of the central controller. In such a distributed antenna system, one or more antennas may be located at one geographically separated antenna position. In an embodiment of the present invention, an antenna or antennas located at the same position in a DAS is/are referred to as an antenna group (RRH group).

In the DAS as shown in FIG. 3, a UE receives a signal from one geographically separated RRH group, and signals transmitted from the other antenna groups act as interference to the UE.

Figure 4:
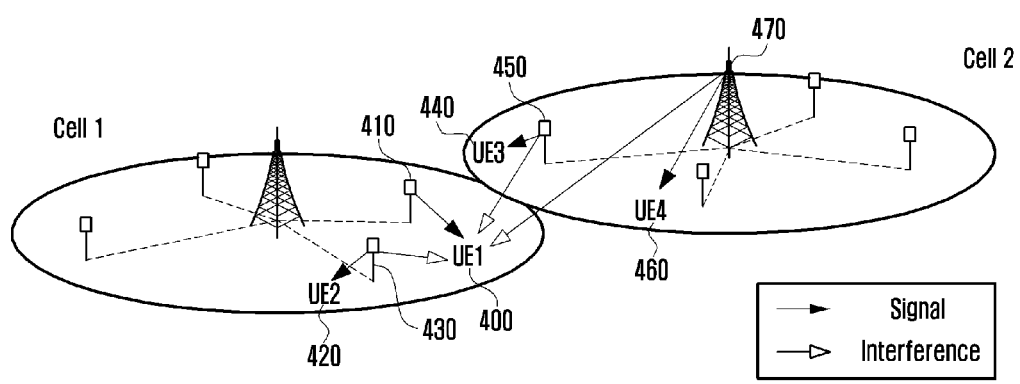
FIG. 4 is a diagram illustrating how interference occurs when respective antenna groups transmit signals to different UEs in a distributed antenna system.

FIG. 4 is a diagram illustrating how interference occurs when respective RRH groups transmit signals to different UEs in a distributed antenna system.

Referring to FIG. 4, UE1 400 receives a traffic signal from RRH group1 410. Further, UE2 420 receives a traffic signal from RRH group2 430, UE3 440 receives a traffic signal from RRH group3 450, and UE4 460 receives a traffic signal from RRH group4 470. In this situation, UE1 400 receives a traffic signal from RRH group1 410, and simultaneously is interfered by the other RRH groups 430, 450, 470 that transmit traffic signals to the other UEs 420, 440, 460. Specifically, the signals transmitted from RRH group2 to RRH group4 430, 450, 470 cause interference to UE1 400.

In a distributed antenna system, interference caused by other RRH groups is classified into the following two types.

Inter-cell interference: interference caused by RRH groups of other cells.
Intra-cell interference: interference caused by RRH groups of the same cell.

In FIG. 4, UE1 400 undergoes intra-cell interference caused by RRH group2 430 belonging to the same cell, Cell 1, and inter-cell interference caused by RRH group3 and RRH group4 450, 470 belonging to the neighbor cell, Cell 2. A UE is simultaneously affected by the inter-cell interference and the intra-cell interference, which impedes the data channel reception of the UE.

In general, when a UE receives a wireless signal, it receives a desired signal along with noise and interference. That is, a received signal can be mathematically expressed by Equation (1) below.

$$r = s + \text{noise} + \text{interference} \quad (1)$$

In Equation (1), r denotes a received signal, s denotes a transmitted signal, noise denotes noise with a Gaussian distribution, and interference denotes an interference signal occurring in wireless communication. The interference signal in Equation (1) may occur in the following situations.

Interference from neighbor transmission point: situation where a desired signal is interfered by signals transmitted from neighbor cells or neighbor antennas in a DAS.
Interference from same transmission point: situation where signals for different users are interfered by each other when MU-MIMO transmission using multiple antennas is performed at one transmission point.

Therefore, the value of an SNIR depends on the magnitude of interference, and consequently interference may have an effect on the reception capability of a UE. In general, interference is the leading cause of system performance deterioration, and system performance is determined depending on how to appropriately control the interference. In order to control interference, various standard technologies for supporting Coordinated Multi-Point (CoMP) transmission and reception, which is a type of collaborative communication, have been introduced in the LTE and LTE-A. In the CoMP, a network determines the existence and magnitude of downlink and uplink interference by comprehensively controlling transmissions from a plurality of eNBs or transmission points. As an example, when there are two eNBs (eNB1 and eNB2), a central controller of a network may interrupt signal transmission from eNB2 in order to prevent the signal transmission from causing interference to a UE that receives a signal from eNB1.

In a wireless communication system, error correction coding is also employed to correct errors in transmission and reception. In the LTE/LTE-A system, a convolution code, a turbo code, and the like are used for the error correction coding.

In order to improve the decoding performance of this error correction coding, a receiver demodulates a modulated symbol such as a Quadrature Phase Shift Keying (QPSK)-, 16 QAM-, or 64 QAM-modulated symbol by using soft decision, rather than hard decision. When a transmitter transmits "+1" or "−1", a receiver employing hard decision selects and outputs either "+1" or "−1" for a received signal. Contrarily, a receiver employing soft decision outputs both information on which of "+1" and "−1" is received for a received signal and the reliability of the corresponding decision. Such reliability information may be used to improve decoding performance in the process of decoding.

A receiver employing soft decision generally uses an LLR to calculate an output value. When BPSK modulation with a transmitted signal of either "+1" or "−1" is applied, the LLR is defined as shown in Equation (2) below.

$$LLR = \log \frac{f(r|s=+1)}{f(r|s=-1)} \quad (2)$$

In Equation (2), r denotes a received signal, and s denotes a transmitted signal. Also, $f(r|s=+1)$ denotes the conditional probability density function of a received signal, which is calculated under the condition that "+1" is transmitted as a transmitted signal. Similarly, $f(r|s=-1)$ denotes the conditional probability density function of a received signal, which is calculated under the condition that "−1" is transmitted as a transmitted signal. For any other modulation such as QPSK, 16 QAM, or 64 QAM, an LLR may also be represented by a mathematical expression in the same manner. In the case of no interference, a conditional probability density function has a Gaussian distribution.

Figure 5:
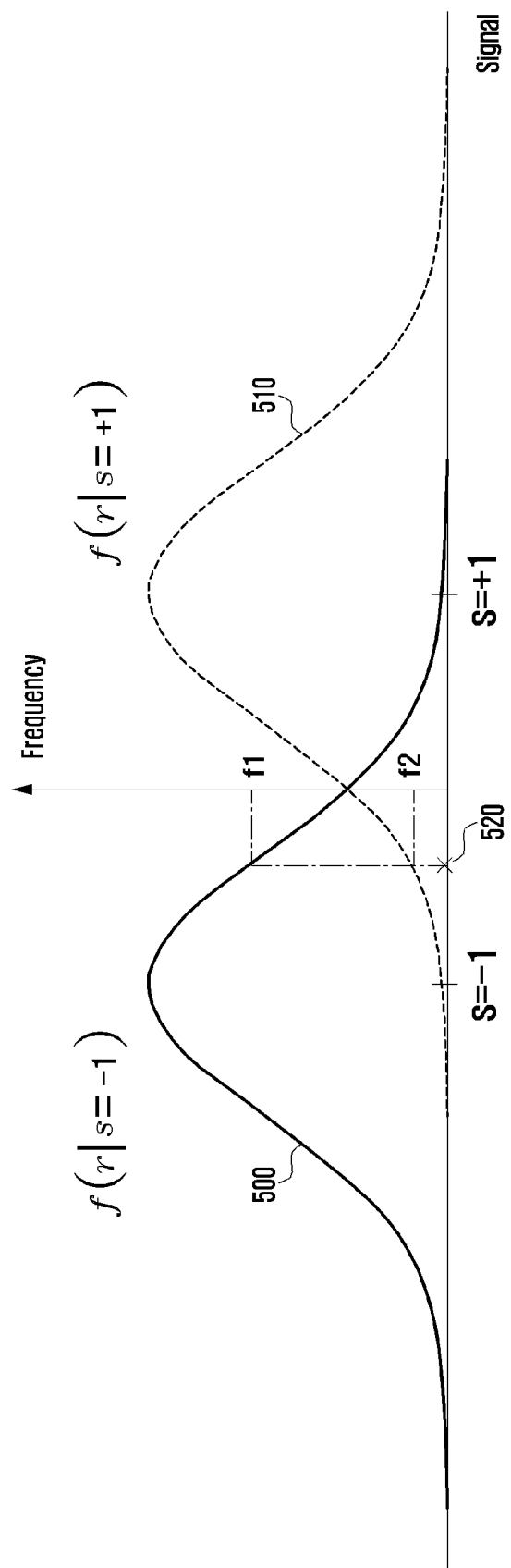
FIG. 5 is a diagram illustrating a conditional probability density function.

FIG. 5 illustrates a conditional probability density function.

In FIG. 5, reference numeral 500 indicates a conditional probability density function corresponding to $f(r|s=1)$, and reference numeral 510 indicates a conditional probability density function corresponding to $f(r|s=+1)$. Using this conditional probability density function, for a received signal designated by reference numeral 520, a receiver calculates the LLR by log(f2/f1). The conditional probability density functions of FIG. 5 are the case where noise and interference follows a Gaussian distribution.

In a mobile communication system such as the LTE/LTE-A system, an eNB transfers several tens of bits or more of information per PDSCH transmission. The eNB encodes information to be transmitted to a UE, modulates the encoded information by using QPSK modulation, 16 QAM, 64 QAM, or the like, and then transmits the modulated information. Additionally, 256 QAM or higher order modulation may also be used. As a result, upon receiving the PDSCH, the UE generates LLRs for several tens or more of encoded symbols in the process of demodulating several tens or more of modulated symbols and transfers the generated LLRs to a decoder.

In general, noise follows a Gaussian distribution, but interference may or may not follow a Gaussian distribution according to situations. The typical reason why interference does not follow a Gaussian distribution is that, dissimilar to noise, interference is a wireless signal for another receiver. That is, since "interference" in Equation (1) is a wireless signal for another receiver, it is modulated using BPSK modulation, QPSK modulation, 16 QAM, 64 QAM, or the like before being transmitted. As an example, when an interference signal is modulated using BPSK, interference has a probability distribution in which the probability having a value of "+k" is the same as the probability of having a value of "−k". Here, "k" is a value determined by the signal strength attenuation effect of a radio channel.

Figure 6:
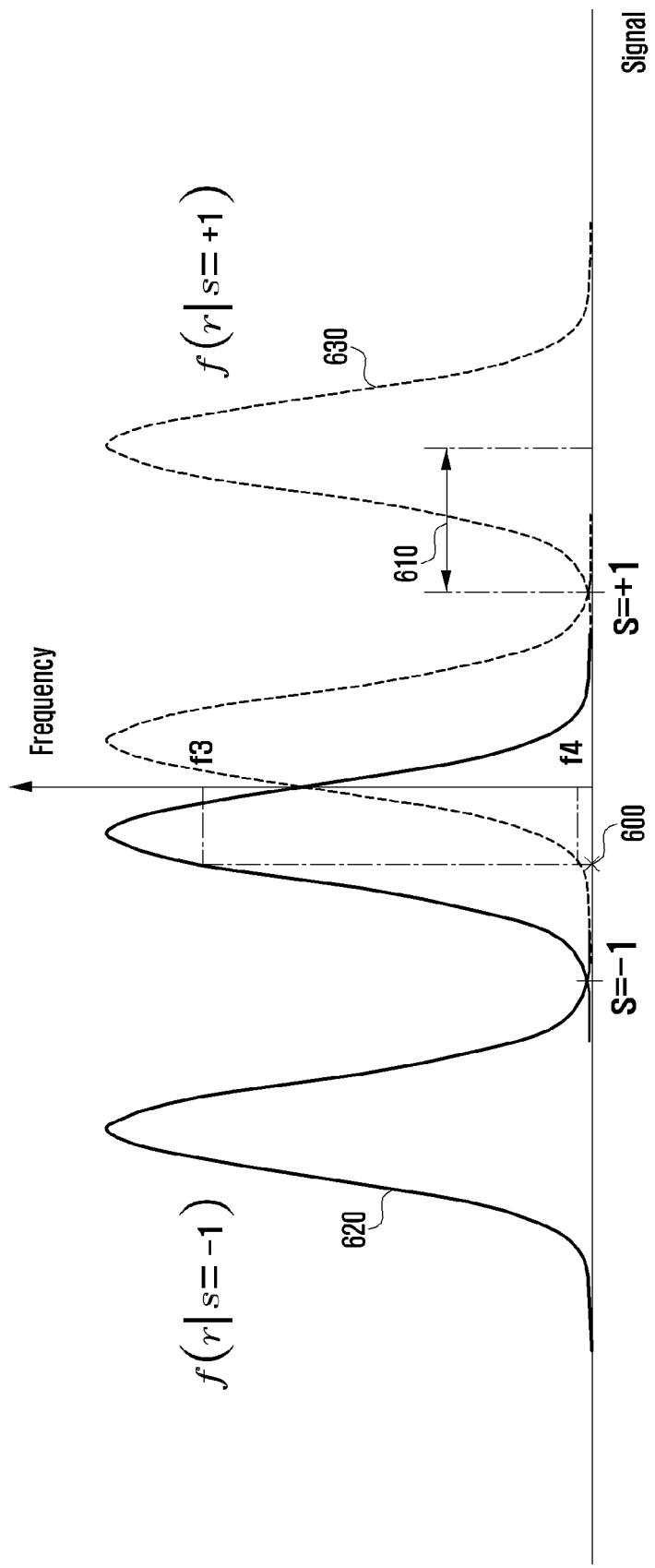
FIG. 6 is a diagram illustrating a conditional probability density function on the assumption that when a received signal is transmitted using Binary Phase Shift Keying (BPSK) modulation, an interference signal is also transmitted using BPSK modulation.

FIG. 6 illustrates a conditional probability density function on the assumption that when a received signal is transmitted using BPSK modulation, an interference signal is also transmitted using BPSK modulation. In FIG. 6, it is assumed that noise follows a Gaussian distribution.

Referring to FIG. 6, the conditional probability density function takes a different shape from the conditional probability density function of FIG. 5. In FIG. 6, reference numeral 620 indicates a conditional probability density function corresponding to $f(r|s=-1)$ and reference numeral 630 indicates a conditional probability density function corresponding to $f(r|s=+1)$. Further, the size of 610 is determined depending on the signal strength of the interference signal (affected by a radio channel). Using this conditional probability density function, for a received signal designated by reference numeral 600, a receiver calculates the LLR by log(f4/f3). Since the conditional probability density functions are different, the LLR of FIG. 6 has a different value from the LLR of FIG. 5. In other words, an LLR calculated in consideration of the modulation order of an interference signal is different from that calculated on the assumption of a Gaussian distribution.

Figure 7:
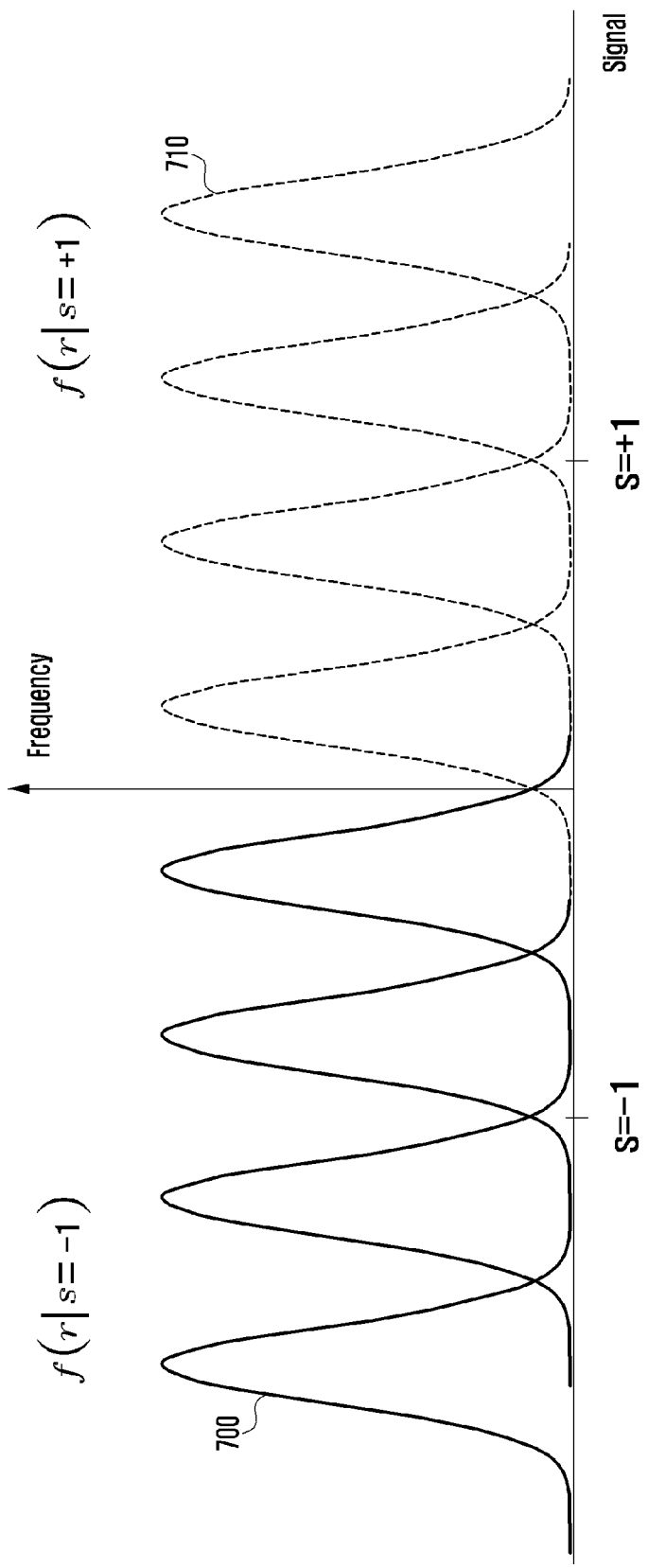
FIG. 7 is a diagram illustrating a conditional probability density function on the assumption that when a received signal is transmitted using BPSK modulation, an interference signal is transmitted using 16-Quadrature Amplitude Modulation (16 QAM)

FIG. 7 illustrates a conditional probability density function on the assumption that when a received signal is transmitted using BPSK modulation, an interference signal is transmitted using 16 QAM modulation.

FIG. 7 shows that a conditional probability function may vary according to a change in the modulation order of an interference signal. Both the received signals of FIG. 6 and FIG. 7 are transmitted using BPSK modulation, but the interference signal of FIG. 6 corresponds to BPSK and the interference signal of FIG. 7 corresponds to 16 QAM. That is, even when a received signal is transmitted using the same modulation, a conditional probability density function may vary according to the modulation order of an interference signal, and consequently a calculated LLR may also vary.

As described in FIGS. 5, 6, and 7, an LLR has different values according to how a receiver assumes interference in calculating the LLR. In order to optimize reception performance, an LLR has to be calculated using a conditional probability density function in which statistical characteristics possessed by the actual interference are reflected. That is, when interference is transmitted using BPSK modulation, a receiver has to calculate an LLR on the assumption of the interference transmitted using BPSK modulation. If interference is transmitted using BPSK modulation, but a receiver assumes that the interference has a Gaussian distribution or the interference is transmitted using 16 QAM, then the receiver calculates a non-optimal LLR value, which results in the inability to optimize reception performance.

Figure 8:
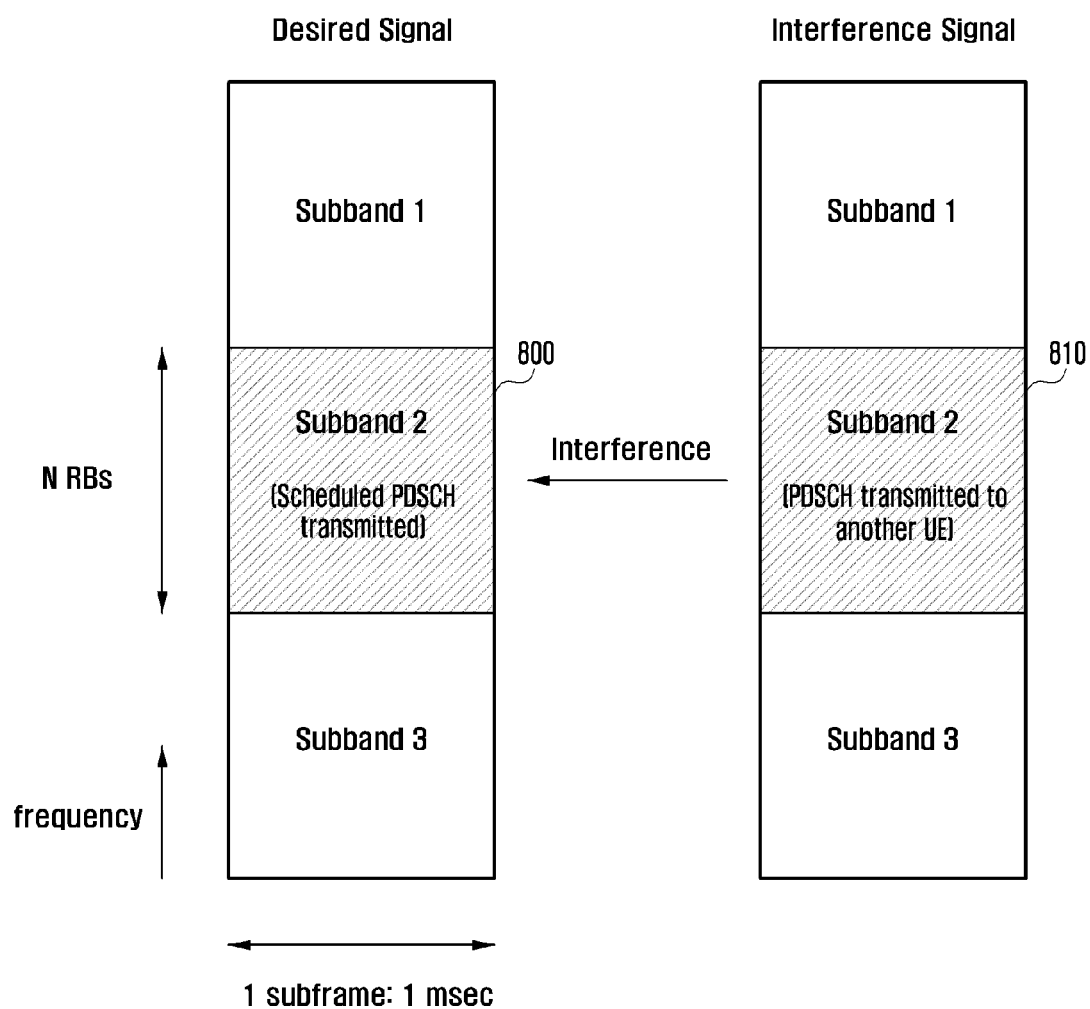
FIG. 8 is a diagram illustrating a situation where interference occurs in an LTE/LTE-A system.

FIG. 8 illustrates a situation in which interference occurs in an LTE/LTE-A system.

In FIG. 8, a UE is intended to receive a desired signal 800. However, an interference signal 810 transmitted to another UE causes interference to the UE. In the case of the LTE/LTE-A system, such an effect occurs when the received signal and the interference signal are transmitted or received in the same frequency interval (subband) of the same sub-frame. In FIG. 8, it is assumed that each of the received signal and the interference signal includes N RBs for transmission.

In FIG. 8, in order to calculate an optimal LLR in the process of detecting the desired signal 800, the UE has to know a correct conditional probability density function in which the statistical characteristics of the interference signal 810 are reflected.

A receiver of the UE typically requires information on the modulation order of the interference signal, which indicates the modulation scheme of the interference signal. It is also important for the receiver to detect the reception strength of the interference signal transmitted using the corresponding modulation order. Only by detecting the reception strength of the interference signal, the value corresponding to 610 of FIG. 6 can be found, and consequently, a correct conditional probability density function can be obtained. Embodiments of the present invention provide a method and an apparatus that allow a UE receiver to detect the modulation order and reception strength of an interference signal.

According to an embodiment of the present invention, the above described operation in which a receiver generates an LLR by considering statistical characteristics according to interference, such as, a conditional probability density function, is referred to as IAD. A UE has to be aware of the modulation order of an interference signal in order to perform the IAD method. This is because a conditional probability density function by which an LLR for the IAD is calculated varies according to the modulation order of an interference signal, as described above.

In addition to the IAD method, a receiver also requires information on the modulation order of an interference signal in Interference Aware Cancellation Decoding (IASD). Otherwise, even in the case of using an advanced receiver that performs different reception operations depending on the modulation order of an interference signal, a UE requires information on the modulation order of an interference signal.

In the most basic way for a UE to detect the modulation order of an interference signal, an eNB specifies control information on the modulation order of an interference signal destined for the UE, as presented below in Table 1, and signals the specified control information to the UE.

TABLE 1

| 2-bit control information | Notification details |
| --- | --- |
| 00 | Interference is transmitted using QPSK modulation |
| 01 | Interference is transmitted using 16QAM modulation |
| 10 | Interference is transmitted using 64QAM modulation |
| 11 | Reserved |

The control information in Table 1 is used in order for an eNB to notify a UE of which modulation order is used to transmit interference. That is, when the control information has a value of "00", a value of "01", and a value of "10", a UE assumes that interference is transmitted using QPSK modulation, 16 QAM, and 64 QAM, respectively. Also, when the control information has a value of "11", the corresponding control information may be used to indicate 256 QAM, define a non-interference state, or the like.

However, in the case of using the above method in which an eNB defines control information, directly indicating the modulation order of an interference signal, and signals the defined control information to a UE in order to allow the UE to know the modulation order, as much signaling overhead as the control information is additionally incurred. This may result in a reduction in overall system performance. In particular, when a receiver performs an operation of processing one or more interference signals, signaling for the modulation order of each interference signal is required. Thus, signaling overhead is increased correspondingly, which leads to an additional reduction in the overall system performance.

Accordingly, to solve the above problems and prevent system performance from being deteriorated, embodiments of the present invention propose a method of notifying a UE of the modulation order of an interference signal, in which an eNB does not explicitly signal the modulation order of an interference signal destined for the UE to the UE. Instead, a UE receiver responsible for IAD is allowed to indirectly detect the modulation order of the interference signal. Additionally, embodiments of the present invention propose a method that can enhance the performance of predicting the modulation order of an interference signal for all receivers capable of indirectly predicting the modulation order of the interference signal.

In an embodiment of the present invention corresponding to a method of detecting the modulation order of an interference signal in an IAD receiver, the most appropriate modulation order is determined based on LLRs calculated according to modulation orders.

Figure 9:
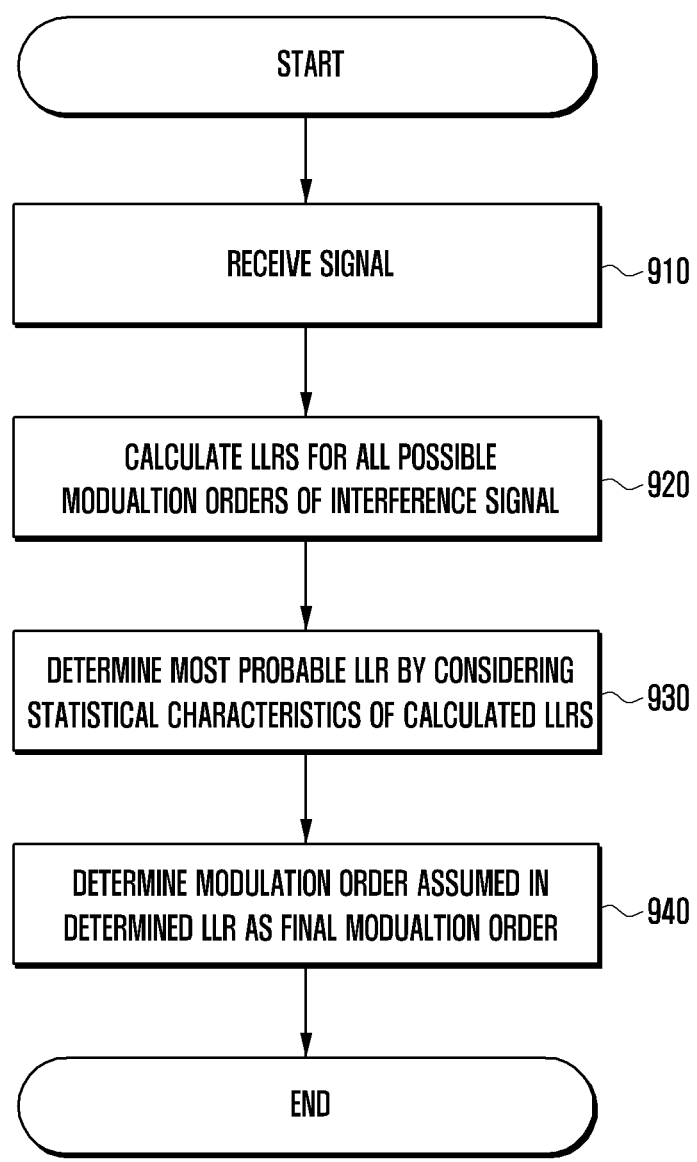
FIG. 9 is a flowchart illustrating an Interference Aware Detection (IAD) receiver operation to detect the modulation order of an interference signal in a UE, according to an embodiment of the present invention.

FIG. 9 is a flowchart illustrating an IAD receiver operation to detect the modulation order of an interference signal in a UE, according to an embodiment of the present invention.

Referring to FIG. 9, in step 910, a UE equipped with an IAD receiver receives a signal including a serving signal transmitted to the UE and an interference signal. In step 920, for all types of modulation orders that the interference signal may take, the UE calculates an LLR corresponding to each modulation order.

If the interference signal may correspond to one of QPSK modulation, 16 QAM, and 64 QAM, then the UE calculates a set of three LLRs for the three modulation orders. That is, the LLR for QPSK is calculated as $LLR_{QPSK}$, the LLR for 16 QAM is calculated as $LLR_{16QAM}$, and the LLR for 64 QAM is calculated as $LLR_{64QAM}$.

In step 930, the UE determines the most probable LLR by using the statistical characteristics of the set of calculated LLRs. In step 940, the UE determines the modulation order corresponding to the LLR determined in step 930 as the final modulation order.

The UE demodulates and decodes the received signal, based on the determined modulation order of the interference signal, to receive the serving signal.

As an example of a method of finding the most probable LLR in step 930, Equation (3) is used, as set forth below.

$$\underset{MO}{\operatorname{argmax}} \sum_i |LLR^i_{MO}|^2 \quad (3)$$

In Equation (3), MO denotes a modulation order having a value corresponding to one of QPSK, 16 QAM, 64 QAM, and all other possible modulation orders, and i denotes the index of the bit sequence of a received signal.

In the above-described embodiment of the present invention, the sum of the squares of LLRs of the respective bits of a received signal is obtained using a set of LLRs calculated for various modulation orders, the LLR maximizing the value of the sum is determined as the most probable LLR, and the modulation order corresponding to the determined LLR is determined as the modulation order of an interference signal. The above-described method is an example of a method of determining the current modulation order of an interference signal by using LLRs calculated for the possible modulation orders of the interference signal. In addition to the above case where the modulation order of an interference signal is determined using the sum of the squares of LLRs for the entire bit sequence, the method of determining the modulation order of an interference signal by using $LLR_{QPSK}$, $LLR_{16QAM}$, $LLR_{64QAM}$, and the like, calculated for all possible modulation orders of an interference signal, may be implemented in various manners, such as, for example, by using the sum of the absolute values of LLRs for the entire bit sequence.

Figure 10:
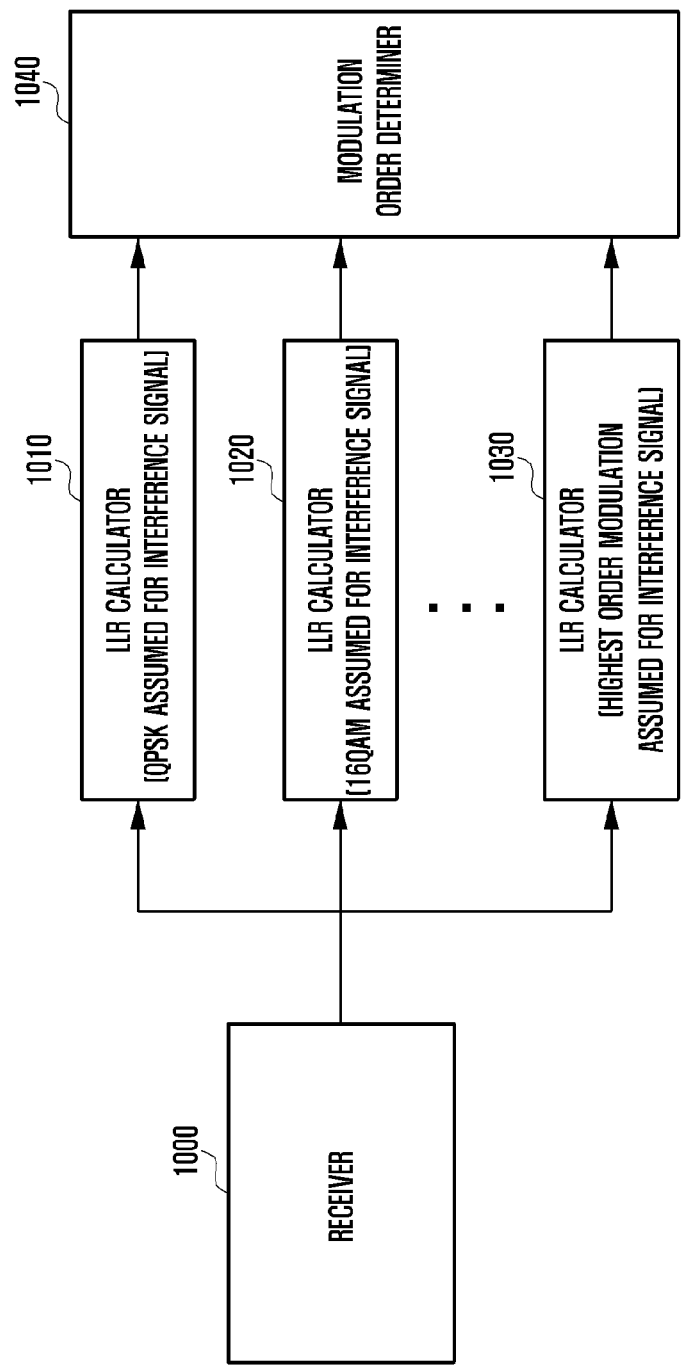
FIG. 10 is a block diagram illustrating a configuration of a UE, according to an embodiment of the present invention.

FIG. 10 is a diagram illustrating a configuration of a UE, according to an embodiment of the present invention. A receiver 1000 of the UE receives a signal including a serving signal and an interference signal. From the received signal, the UE calculates LLRs for the possible modulation orders of the interference signal by using LLR calculators corresponding to the number of the possible modulation orders, including an LLR calculator 1010 in which QPSK is assumed as the modulation order of the interference signal, an LLR calculator 1020 in which 16 QAM is assumed as the modulation order of the interference signal, and the other LLR calculators continued up to an LLR calculator 1030 in which the highest order modulation is assumed as the modulation order of the interference signal. The LLRs calculated by the LLR calculators 1010 to 1030 are input into a modulation order determiner 1040. The modulation order determiner 1040 determines the modulation order of the interference signal by using a modulation order determination method that considers the statistical characteristics of the LLRs.

The UE may further include a demodulator and a decoder for receiving the serving signal by using the modulation order of the interference signal, determined in the modulation order determiner 1040.

Another embodiment of the present invention corresponds to a method of detecting the modulation order of an interference signal by using a soft bit output from a channel decoder included in an IAD receiver. The channel decoder that can be used in the second embodiment of the present invention is a decoder that outputs soft bits, and may use, for example, a turbo decoder or an LDPC decoder.

Figure 11:
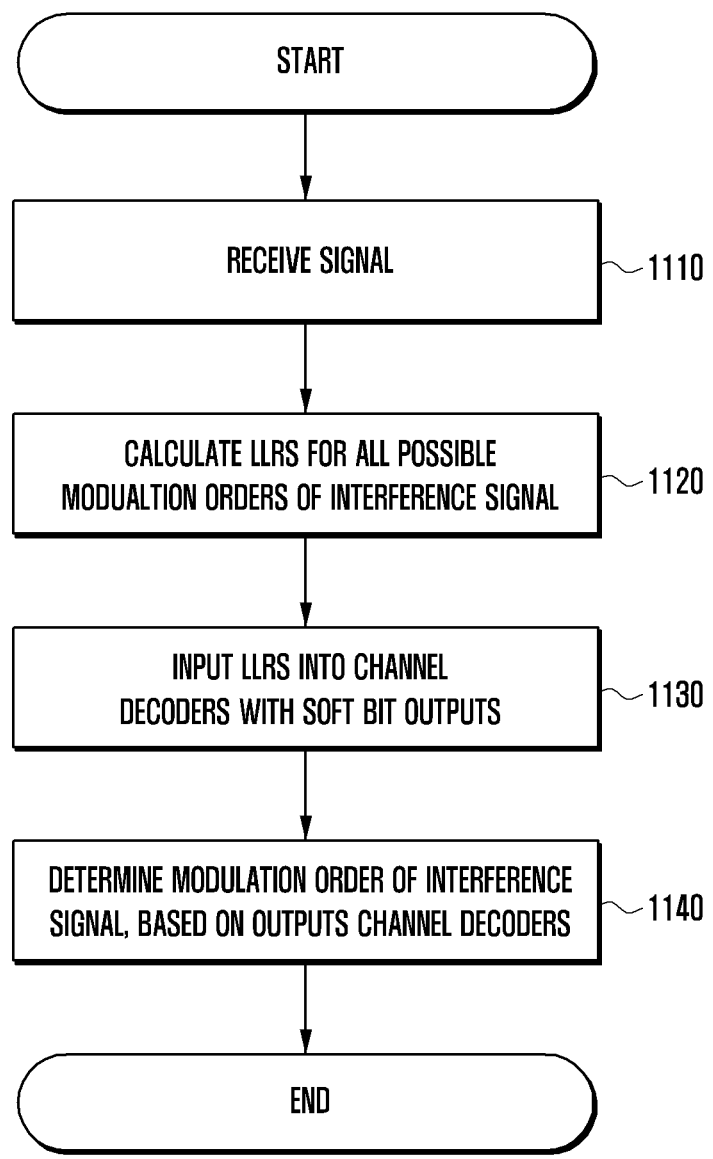
FIG. 11 is a flowchart illustrating a receiver operation to detect the modulation order of an interference signal in a UE, according to an embodiment of the present invention.

FIG. 11 is a flowchart illustrating a receiver operation to detect the modulation order of an interference signal in a UE, according to an embodiment of the present invention.

Referring to FIG. 11, in step 1110, a receiver of the UE receives a signal including a serving signal and an interference signal. In step 1120, for all types of modulation orders that the interference signal may take, the UE calculates an LLR corresponding to each modulation order. Steps 1110 and 1120 of FIG. 11 may be performed in substantially the same manner as steps 910 and 920 of FIG. 9.

Subsequently, in step 1130, the UE inputs the three calculated LLRs into different channel decoders, respectively. In step 1140, the UE determines the modulation order of the interference signal by using the properties of soft bits output from the respective channel decoders.

More specially, as an example of a method of determining the modulation order of the interference signal in step 1140, Equation (4) may be used, as set forth below.

$$\underset{MO}{\mathrm{argmax}} \sum_{i} |\mathrm{SOFT\_OUT}_{MO}^{i}|^{2} \quad (4)$$

In Equation (4), SOFT_OUT denotes a soft bit sequence output from a channel decoder, MO denotes a possible modulation order for an interference signal, which has a value corresponding to one of various modulation orders including QPSK, 16 QAM, 64 QAM, and the like, and i denotes the index of the bit sequence of a received signal.

Specifically, information output after the LLR calculated on the assumption that the modulation order of the interference signal corresponds to QPSK is input into the corresponding channel decoder and is decoded by the channel decoder may be referred to as $\mathrm{SOFT\_OUT}_{QPSK}$. Information output after the LLR calculated on the assumption that the modulation order of the interference signal corresponds to 16 QAM is input into the corresponding channel decoder and is decoded by the channel decoder may be referred to as $\mathrm{SOFT\_OUT}_{16QAM}$. Information output after the LLR calculated on the assumption that the modulation order of the interference signal corresponds to 64 QAM is input into the corresponding channel decoder and is decoded by the channel decoder may be referred to as $\mathrm{SOFT\_OUT}_{64QAM}$.

In step 1140, for various modulation orders, the UE obtains the sum of the squares of the output bits calculated in this way, and determines the modulation order maximizing the sum value as the most probable modulation order.

The method as described above is an example of a method of separately inputting LLRs, calculated using the possible modulation orders of an interference signal, into channel decoders respectively, decoding the input LLRs, and detecting the current modulation order of the interference signal by using the information output from the channel decoders. The method of detecting the modulation order of an interference signal by using channel decoder outputs such as $\mathrm{SOFT\_OUT}_{QPSK}$, $\mathrm{SOFT\_OUT}_{16QAM}$, and $\mathrm{SOFT\_OUT}_{64QAM}$ may be implemented in various manners, for example, by using the sum of the squares of bit sequences output from channel decoders, as described above, by using the sum of the absolute values of bit sequences output from channel decoders, or the like.

Figure 12:
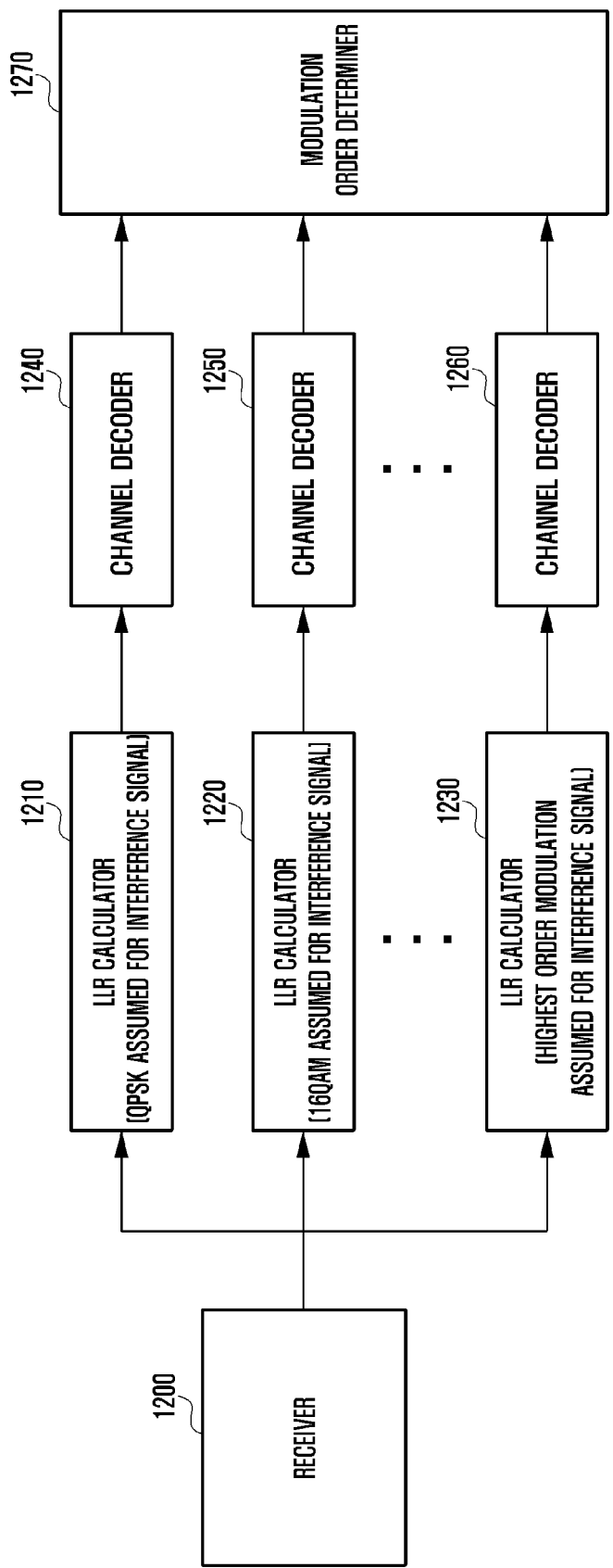
FIG. 12 is a block diagram illustrating a configuration of a UE, according to an embodiment of the present invention.

FIG. 12 is a diagram illustrating a configuration of a UE, according to an embodiment of the present invention.

Referring to FIG. 12, an IAD receiver 1200 of the UE receives a signal including a serving signal and an interference signal. An LLR calculator 1210 in which QPSK is assumed as the modulation order of the interference signal, an LLR calculator 1220 in which 16 QAM is assumed as the modulation order of the interference signal, and the other LLR calculators continued up to an LLR calculator 1230 in which the highest order modulation is assumed as the modulation order of the interference signal calculate LLRs for the possible modulation orders of the interference signal, respectively.

The LLRs calculated by the LLR calculators 1210 to 1230 are input into different channel decoders 1240 to 1260 respectively, and soft bits output from the respective channel decoders 1240 to 1260 are input into a modulation order determiner 1270.

The modulation order determiner 1270 determines the modulation order of the interference signal by using the above described modulation order determination method that considers the statistical characteristics of the bits output from the channel decoders 1240 to 1260.

Hereinafter, a description is provided of parameters having an effect on determining the modulation order of an interference signal in an advanced receiver that can self-determine the modulation order of an interference signal, as the IAD receiver according to the above-described embodiments of the present invention. A description is also provided for a method of effectively determining the modulation order of an interference signal in correspondence with these parameters.

As described above, a UE including an advanced receiver, such as an IAD receiver, may detect the modulation order of an interference signal by using the methods according to the above-described embodiments of the present invention.

Figure 13:
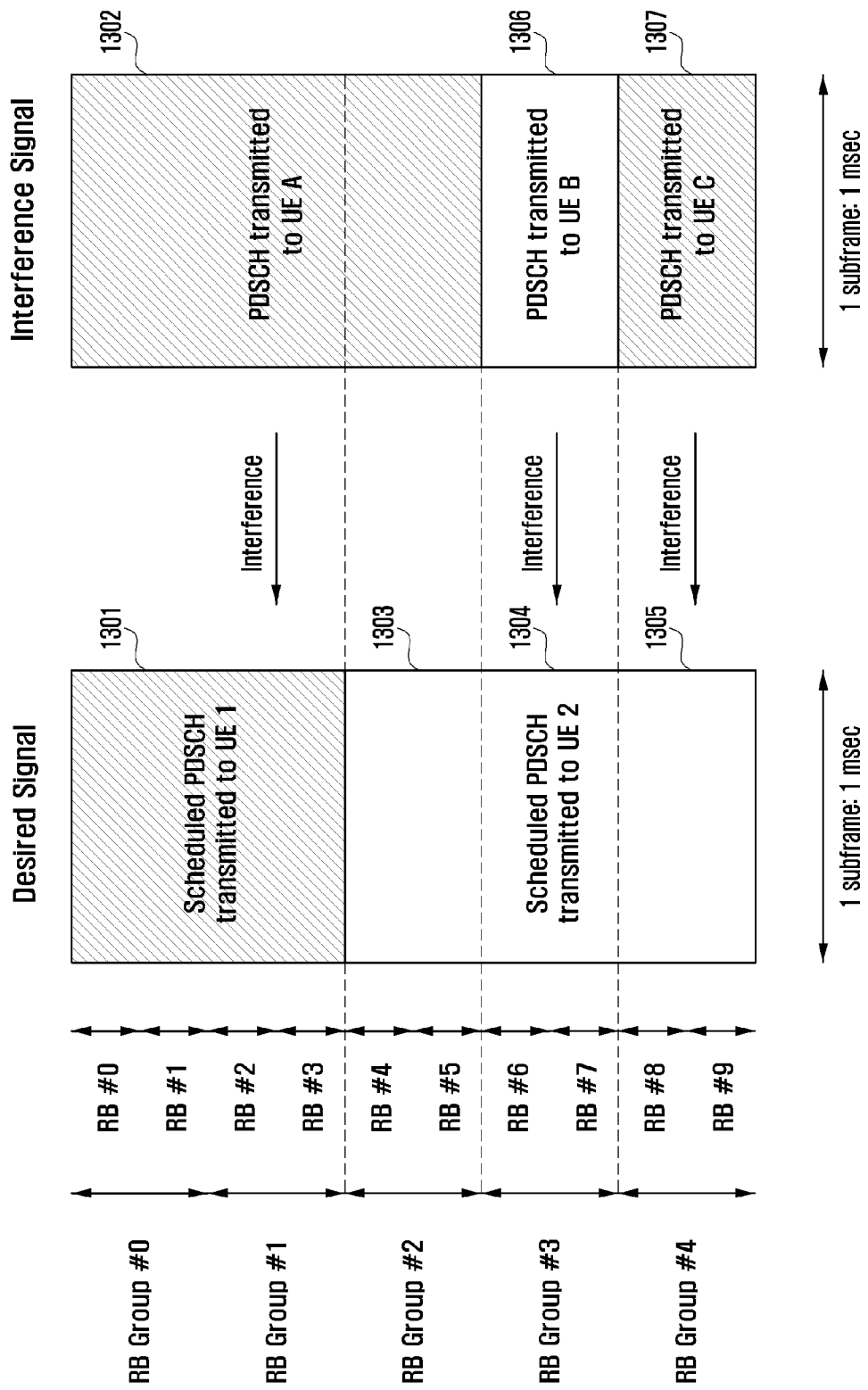
FIG. 13 is a diagram illustrating a case where a UE performs an IAD operation by using a serving signal and an interference signal in order to determine the modulation order of the interference signal, according to an embodiment of the present invention.

FIG. 13 is a diagram illustrating a case where a UE performs an IAD operation by using a serving signal and an interference signal in order to determine the modulation order of the interference signal, according to an embodiment of the present invention.

Referring to FIG. 13, UE1 receives a PDSCH 1301 in a frequency region of RB0, RB1, RB2, and RB3, and UE2 receives PDSCHs 1303, 1304, 1305 in a frequency region of RB4, RB5, RB6, RB7, RB8, and RB9. Along with the received signal, UE1 simultaneously receives a part (RB0, RB1, RB2, and RB3) of a PDSCH 1302 transmitted to UE A, which acts as an interference signal interfering with the received signal. Along with the received signal, UE2 simultaneously receives a part (RB4, RB5) of the PDSCH 1302 transmitted to UE A, a PDSCH 1306 transmitted to UE B, and a PDSCH 1307 transmitted to UE C, which act as interference signals interfering with the received signal.

Since the interference signal received by UE1 is a signal transmitted to one UE, that is, UE A, the modulation order of the interference signal is the same at least in the same time interval, that is, in the same LTE sub-frame. However, since the interference signals received by UE2 is an aggregate of signals transmitted to UE A, UE B, and UE C, the modulation orders of the interference signals may be different. In other words, the criterion for determining the modulation order of the interference signal may be differently defined for UE1 and UE2.

More specially, in the case of UE1, assuming that the modulation order of the interference signal received over all the scheduled resources (RB0, RB1, RB2, and RB3) is the same, the number of samples of the interference signal is increased, and thus, the modulation order of the interference signal is determined more correctly. Contrarily, in the case of UE2, assuming that the modulation orders of the interference signals received over all the scheduled resources (RB4, RB5, RB6, RB7, RB9, and RB9) are the same, the modulation order of interference is incorrectly determined, which leads to a significant reduction in reception performance. Therefore, in order to avoid such a reduction in reception performance, it is required to recognize the fact that different interference signals are received in units of two RBs and accordingly determine the modulation order of the interference signal in units of two RBs.

As described above, information on resources scheduled to a UE and information on interference included in the corresponding resources are needed to correctly determine the modulation order of a received interference signal.

Accordingly, a method for effectively determining the modulation order of an interference signal by a UE is described in detail below with respect to additional embodiments of the present invention.

Another embodiment of the present invention corresponds to a method in which an eNB notifies a UE of information for identifying interference signals, which the UE receives, through upper signaling.

When a UE equipped with an advanced receiver capable of enhancing reception performance by using an interference signal, as described above, is aware of whether the modulation order of interference signals is the same or may be different in scheduled resources, the advanced receiver can correctly detect the modulation order of the interference signal to thereby enhance reception performance.

Accordingly, in an embodiment of the present invention, an eNB notifies a UE of information on the units in which the UE can determine the modulation order of an interference signal through upper signaling, and the UE can identify resources over which the modulation order is the same, based on the information notified through upper signaling, thereby correctly determining the modulation order of the interference signal. Accordingly, the UE may determine the modulation order of the interference signal only for the corresponding resources, and use the determined modulation order to receive a serving signal.

An example of information on the modulation order of an interference signal, which an eNB notifies a UE of through upper signaling, is presented below in Table 2.

TABLE 2

| Index | Modulation order of interference |
|---|---|
| 0 | Same modualtion order is applicable over all scheduled resources |
| 1 | Different modulation oders are applicable in units of one RB |
| 2 | Different modulation oders are applicable in units of two RBs |
| 3 | Different modulation oders are applicable in units of n RBs |

Each index value and corresponding modulation order information of interference as shown in Table 2 are pre-configured between an eNB and a UE, and the UE can obtain information on the modulation order of interference by receiving the index value from the eNB through upper signaling.

More specially, when index 0 in Table 2 is signaled to a UE, the UE determines that the modulation order of received interference is the same over all allocated resources, and determines the modulation order of interference for all the resources. In contrast, when one of indexes 1 to 3 in Table 2 is signaled to a UE, the UE determines the modulation order of interference for resources corresponding to each signaled unit, that is, in units of one RB, two RBs, or n RBs among all allocated resources, and uses the determined modulation orders to receive a serving signal. In the case of index 3, "n" may be set to any value.

Table 2 is provided an example of the above-described embodiment of the present invention, and the present invention is not limited thereto. For example, index values and corresponding modulation order information of interference may be set differently according to the units in which modulation orders are applied.

Another embodiment of the present invention corresponds to a method in which an eNB notifies a UE of information for identifying interference signals, which the UE receives through physical layer signaling.

When a UE, which is equipped with an advanced receiver capable of enhancing reception performance by using an interference signal, is aware of whether the modulation order of the interference signal is the same or may be different in scheduled resources, the advanced receiver can correctly detect the modulation order of the interference signal to thereby enhance reception performance.

Accordingly, in this embodiment of the present invention, an eNB notifies a UE of information on the units in which the UE can determine the modulation order of an interference signal through physical layer signaling. The UE can identify resources over which the modulation order is the same, based on the information notified through physical layer signaling, thereby correctly determining the modulation order of the interference signal. Accordingly, the UE may determine the modulation order of the interference signal only for the corresponding resources, and use the determined modulation order to receive a serving signal.

An example of information on the modulation order of an interference signal, which an eNB notifies a UE of through physical layer signaling, is presented below in Table 3.

TABLE 3

| Index | Modulation order of interference |
|---|---|
| 0 | Same modulation order is applied over all scheduled resources |

TABLE 3-continued

| Index | Modulation order of interference |
|---|---|
| 1 | Same modulation order is not applied over all scheduled resources |

Each index value and corresponding modulation order information of interference as shown in Table 3 are pre-configured between an eNB and a UE. The UE can obtain information on the modulation order of interference by receiving the index value from the eNB through physical layer signaling.

More specially, when index 0 in Table 3 is signaled to a UE through physical layer signaling, the UE determines that the modulation order of received interference is the same over all allocated resources, and determines the modulation order of interference for all the resources. In contrast, when index 1 in Table 3 is signaled to a UE, the UE determines the modulation order of interference in units of one RB for all allocated resources respectively, and uses the determined modulation orders to receive a serving signal.

Table 3 is provided as an example of the above-described embodiment of the present invention, and the present invention is not limited thereto. For example, index values and corresponding modulation order information of interference may be set differently according to the units in which modulation orders are applied.

Another embodiment of the present invention corresponds to a method in which an eNB notifies a UE of information for identifying interference signals, which the UE receives through a combination of upper signaling and physical layer signaling.

When an UE, which is equipped with an advanced receiver capable of enhancing reception performance by using an interference signal, is aware of whether the modulation order of interference signals is the same or may be different in scheduled resources, the advanced receiver can correctly detect the modulation order of the interference signal to thereby enhance reception performance.

Accordingly, in this embodiment of the present invention, an eNB notifies a UE of information on the units in which the UE can determine the modulation order of an interference signal through physical layer signaling. When different modulation orders are applicable in units of n (n is any value) resources, as in the case of index 3 in Table 2, the eNB notifies the UE of corresponding information on the value of n through upper signaling. The UE can identify resources over which the modulation order is the same, based on the information notified through upper signaling and physical layer signaling, thereby correctly determining the modulation order of the interference signal. Accordingly, the UE may determine the modulation order of the interference signal only for the corresponding resources, and use the determined modulation order to receive a serving signal.

An example of information, which an eNB notifies a UE of through physical layer signaling, is presented below in Table 4.

TABLE 4

| Index | Modulation order of interference |
|---|---|
| 0 | Same modulation order is applied over all scheduled resources |
| 1 | Different modulation orders are applicable in units of n RBs |

Each index value and corresponding modulation order information of interference as shown in Table 4 are pre-configured between an eNB and a UE. The UE can obtain information on the modulation order of interference by receiving the index value from the eNB through physical layer signaling.

More specially, when index 0 in Table 4 is signaled to a UE through physical layer signaling, the UE determines that the modulation order of received interference is the same over all allocated resources, and determines the modulation order of interference for all the resources. In contrast, when index 1 in Table 4 is signaled to a UE through physical layer signaling, the UE determines the modulation order of interference in units of n RBs among all allocated resources by using information on the value of n, recently received through upper signaling, and uses the determined modulation orders to receive a serving signal.

Table 4 is provided as an example of the above-described embodiment of the present invention, and the present invention is not limited thereto. For example, index values and corresponding modulation order information of interference may be differently set according to the units in which modulation orders are applied. Further, an eNB may further transmit additional information on the modulation order of an interference signal to a UE through upper signaling.

Another embodiment of the present invention corresponds to a method in which a criterion for identifying interference signals, which the UE receives, is defined as a specific value, for example, "m", in the standard.

That is, according to this embodiment of the present invention, a UE may assume that different modulation orders are applied in units of m RBs among all allocated resources. Accordingly, in the operation of determining the modulation order of interference, the UE may determine the modulation order of the interference in units of m RBs among all the allocated resources, and use the determined modulation orders to receive a serving signal.

Another embodiment of the present invention corresponds to a method of indirectly detecting information for identifying interference signals, which a UE receives, by receiving other information.

According to this embodiment of the present invention, an eNB may notify a UE of information related to an interference signal, that is, the DMRS information of an interference signal, through physical layer signaling. The DMRS information may include port information and scrambling (scid) information. For signaling of the DMRS information, index values and corresponding DMRS information of interference may be set as presented below in Table 5.

TABLE 5

| Index | DMRS information of interference |
|---|---|
| 0 | 1 layer, port 7, scid = 0 |
| 1 | 1 layer, port 7, scid = 1 |
| 2 | 1 layer, port 8, scid = 0 |
| 3 | 1 layer, port 8, scid = 1 |
| 4 | 1 layer, port 9, scid = 0 |
| 5 | 1 layer, port 10, scid = 0 |
| 6 | No IAD |
| 7 | |

Each index value and corresponding DMRS information of interference as shown in Table 5 are pre-configured between an eNB and a UE. The UE can obtain the DMRS information of interference by receiving the index value from the eNB.

In this case, the DMRS information of interference, notified by the eNB to the UE, implies that interference signals having the same configurations exist in resources allocated to the UE. Therefore, upon receiving the DMRS information of interference, the UE may assume that the modulation orders of interference signals received in allocated resources are the same.

In the example of Table 5, six pieces of information are used to indicate the DMRS information of interference, but 3-bit information is finally required for physical layer signaling, and thus two pieces of information may be additionally notified.

In this embodiment of the present invention, when one of the two pieces of information (index 6 or 7) is signaled to a UE, an eNB cannot notify the UE of the DMRS information of interference. At the same time, the UE cannot assume the same modulation order of interference over all allocated resources, which is defined as including information indicating that different modulation orders are applicable in units of minimum allocated resources.

Accordingly, in the operation of determining the modulation order of interference, a UE may assume the same modulation order over all allocated resources when indexes 0 to 5 are signaled to the UE, and assume different modulation orders applicable in units of minimum allocated resources among all allocated resources when indexes 6 and 7 are signaled to the UE.

Figure 14:
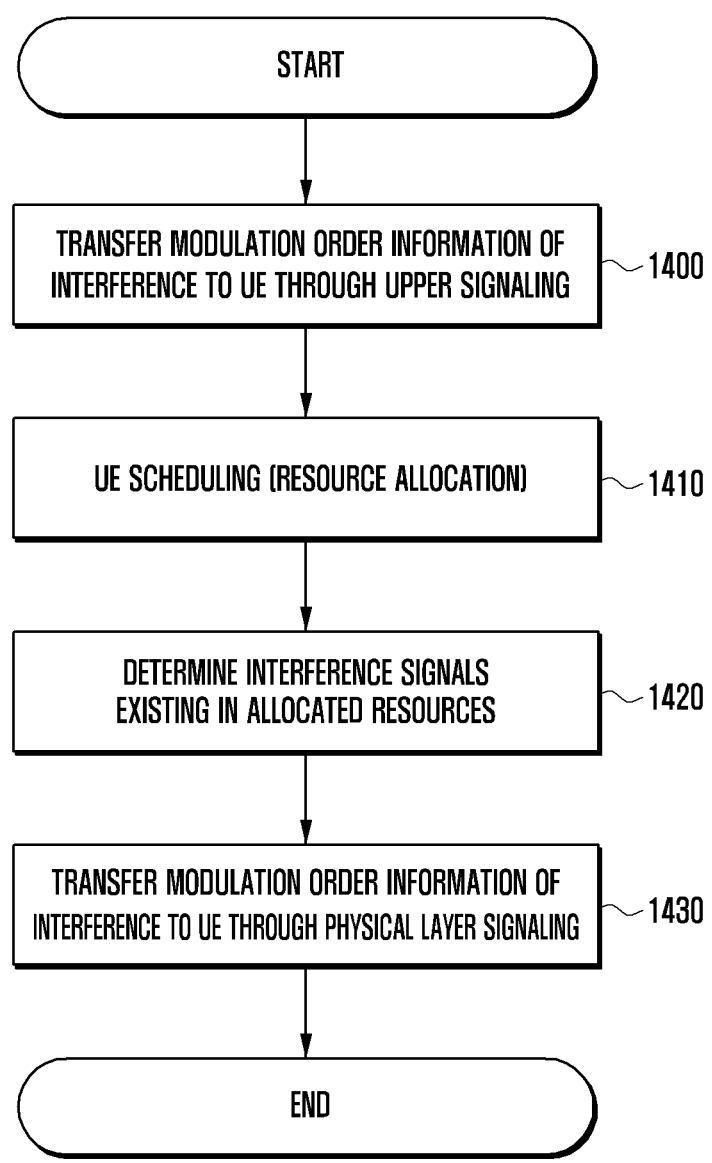
FIG. 14 is a flowchart illustrating a procedure of transmitting information related to an interference signal to a UE by a base station, according to an embodiment of the present invention.

FIG. 14 is a flowchart illustrating a procedure of transmitting information related to an interference signal to a UE by an eNB, according to an embodiment of the present invention. FIG. 14 is based on the embodiment of the present invention in which modulation order information is transmitted through both upper signaling and physical layer signaling, but corresponds to the operations other embodiments when step 1400 or steps 1420 and 1430 are omitted.

Referring to FIG. 14, in step 1400, an eNB transfers the modulation information of interference to a UE through upper signaling. In step 1400, information on the value of "n" is transferred to the UE through upper signaling.

In step 1410, the eNB determines resources to be allocated to the UE through scheduling, and in step 1420, determines interference signals existing in the resources allocated to the UE. In step 1430, the eNB performs physical layer signaling, i.e., determines one of indexes 0 and 1 in Table 4 and transfers the determined index to the UE, based on information on the determined interference signals.

Figure 15:
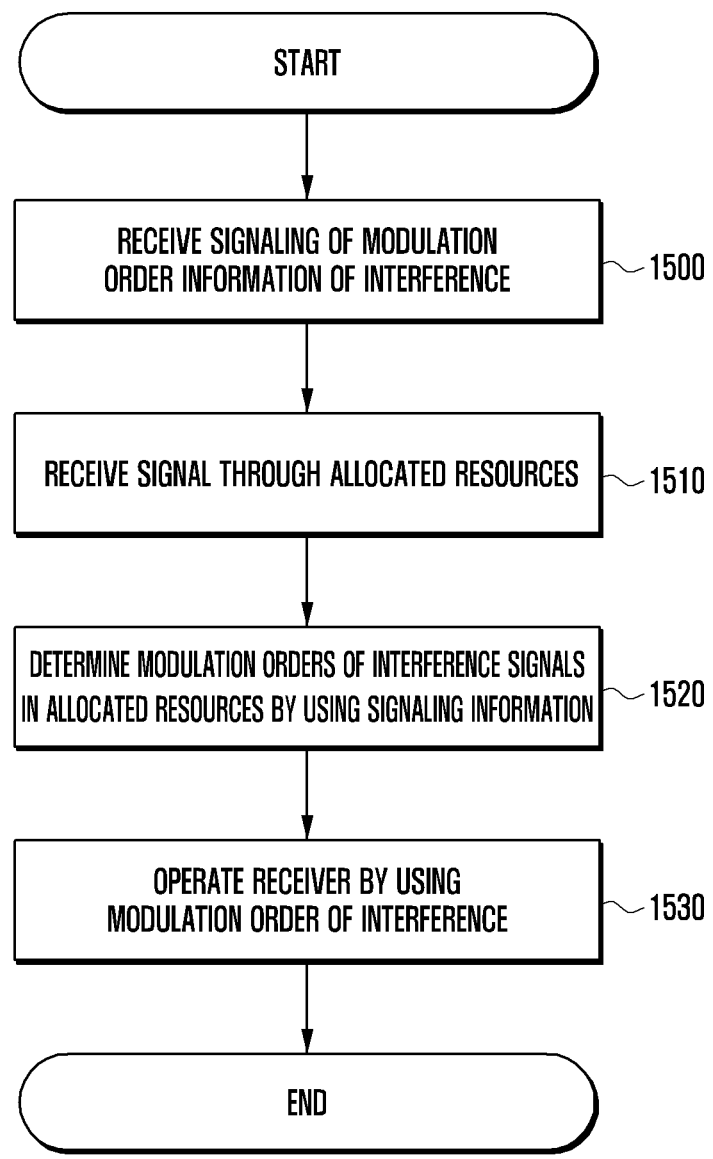
FIG. 15 is a flowchart illustrating a procedure of receiving information related to an interference signal from a base station by a UE, according to an embodiment of the present invention.

FIG. 15 is a flowchart illustrates a procedure of receiving information related to an interference signal from an eNB by a UE, according to an embodiment of the present invention.

Referring to FIG. 15, in step 1500, a UE receives signaling of information on the modulation order of interference from an eNB. The signaling for transmission of the modulation order information of interference may be either or both upper signaling and physical signaling according to the above described embodiments of the present invention. Step 1500 may be omitted in the case of no signaling.

In step 1510, the UE receives a signal through allocated resources, and in step 1520, determines the modulation order of an interference signal included in the received signal, based on the modulation order information of interference, received in step 1500. In step 1530, the UE performs the reception operation of an advanced receiver, such as an IAD receiver, by using the determined modulation order of the interference signal.

Figure 16:
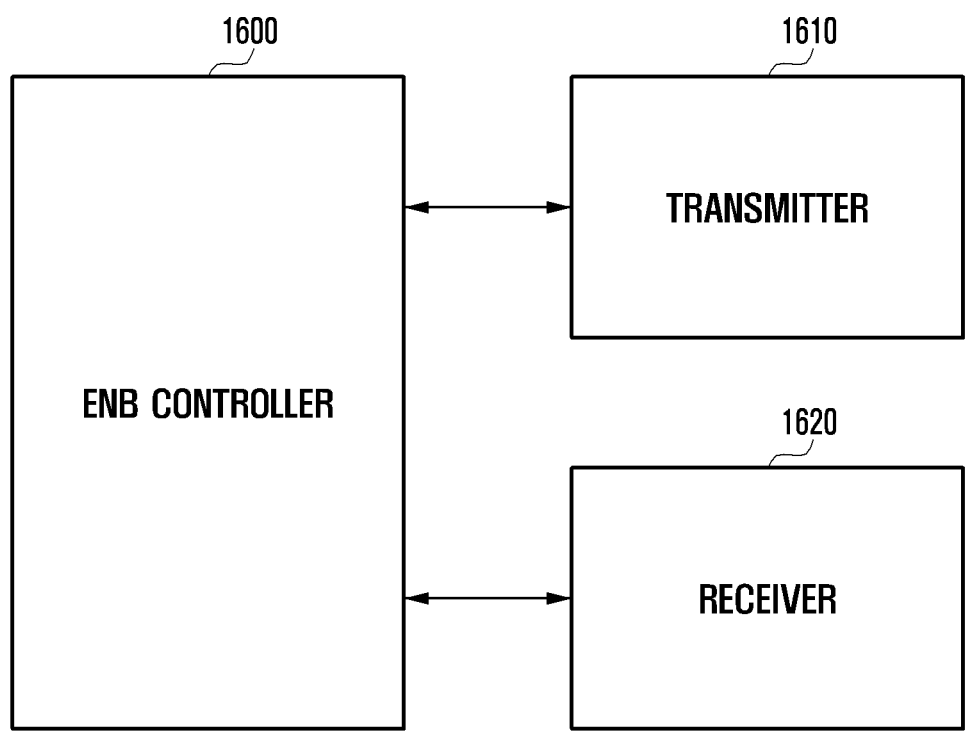
FIG. 16 is a block diagram illustrating a configuration of a base station, according to an embodiment of the present invention.

FIG. 16 is a diagram illustrating a configuration of an eNB, according to an embodiment of the present invention.

Referring to FIG. 16, an eNB controller 1600 determines configurations of a UE receiver, information on the configurations of interference to the UE, including the modulation order of an interference signal, and PDSCH scheduling for the UE. The information on the configurations of interference to the UE, determined by the eNB, is notified to the UE by using a transmitter 1610. Further, according to the PDSCH scheduling determined by the eNB, the transmitter 1610 transmits a PDCCH/ePDCCH and a PDSCH to the UE. The eNB receives the channel state information of the UE by using a receiver 1620.

Figure 17:
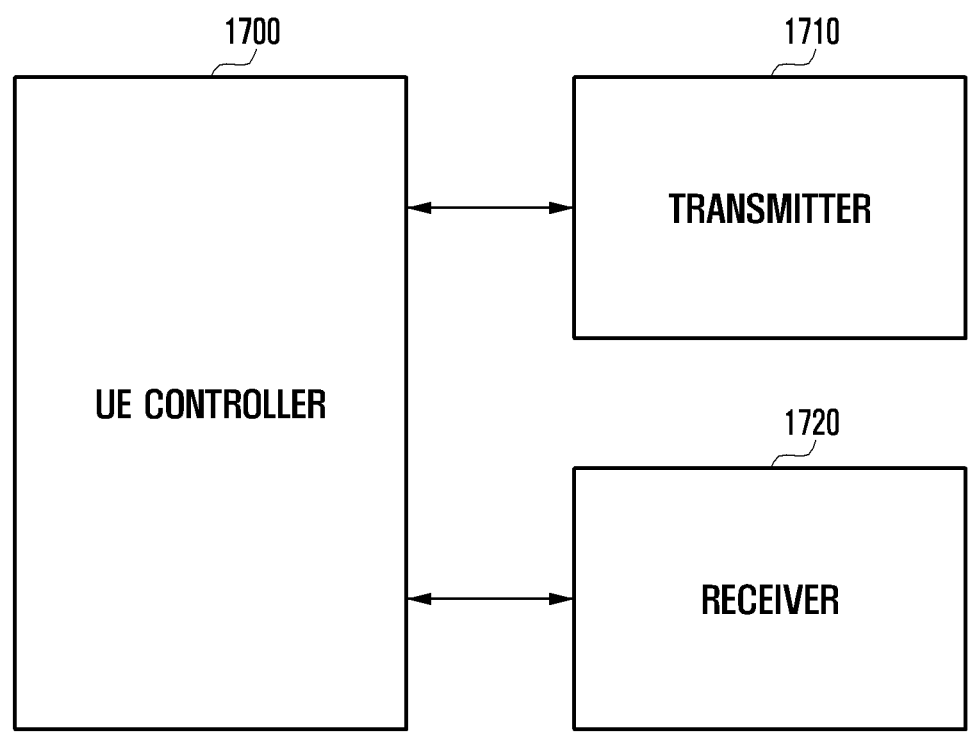
FIG. 17 is a block diagram illustrating a configuration of a UE, according to an embodiment of the present invention.

FIG. 17 is a diagram illustrating a configuration of a UE, according to an embodiment of the present invention.

Referring to FIG. 17, a UE controller 1700 receives information on the configurations of interference, including a modulation order, from an eNB by using a receiver 1720, and thereby detects the criterion for determining the modulation order of interference. Further, the receiver 1720 decodes a PDCCH/ePDCCH to allow the UE controller 1700 to determine when a PDSCH is scheduled. The UE may receive control information related to the modulation order of interference through information notified using the PDCCH/ePDCCH/PDSCH. Further, the UE may transmit channel state information to the eNB by using a transmitter 1710.

The methods and apparatus for transmitting and receiving a signal by using the modulation order of an interference signal can improve the accuracy of signal reception without deteriorating system performance because a user equipment indirectly estimates the modulation order without increasing signaling overhead caused when a base station directly informs the UE of the modulation order of the interference signal.

Those skilled in the art can appreciate that it is possible to implement embodiments of the present invention in another specific form without changing the technical idea or the indispensable characteristics of the present invention. Therefore, it should be understood that the above-described embodiments are illustrative and are not limiting under any possible interpretation. The scope of the present invention is defined by the appended claims, rather than the detailed description. Accordingly, it should be appreciated that all modifications or variations derived from the meaning and scope of the appended claims and their equivalents fall within the scope of the present invention.

What is claimed is:

1. A method of receiving a serving signal from a base station by a user equipment, the method comprising the steps of:
    receiving, from the base station, modulation order information for determining a modulation order of an interference signal;
    receiving, from the base station, a signal that includes the serving signal and the interference signal;
    determining the modulation order of the interference signal, based on the modulation order information; and
    reconstructing the serving signal, based on the determined modulation order.

2. The method of claim 1, wherein the modulation order information includes an index indicating whether the modulation order of the interference signal is identical in resources allocated to the user equipment.

3. The method of claim 1, wherein the modulation order information includes an index having a value determined based on a number of consecutive resource blocks over which the modulation order of the interference signal is identical in resources allocated to the user equipment.

4. The method of claim 1, wherein the modulation order information is received using at least one of upper signaling and physical layer signaling.

5. The method of claim 4, wherein, in the modulation order information, information indicating whether the modulation order of the interference signal is identical in resources allocated to the user equipment is received through physical layer signaling, and information indicating a number of consecutive resource blocks over which the modulation order of the interference signal is identical in the allocated resources is received through upper signaling.

6. The method of claim 1, wherein the modulation order information includes information on a Demodulation Reference Signal (DMRS) of the interference signal and an index indicating that the modulation order of the interference signal is different in units of a predetermined number of resource blocks in resources allocated to the user equipment.

7. The method of claim 6, wherein, in the determining of the modulation order of the interference signal, the modulation order of the interference signal is identical in the resources allocated to the user equipment when the index included in the modulation order information indicates the information on the DMRS of the interference signal.

8. A user equipment that receives a serving signal from a base station, the user equipment comprising:
   a receiver that receives, from the base station, modulation order information for determining a modulation order of an interference signal, and a signal that includes the serving signal and the interference signal;
   a controller that determines the modulation order of the interference signal, based on the modulation order information; and
   a signal reconstructor that reconstructs the serving signal, based on the determined modulation order.

9. The user equipment of claim 8, wherein the modulation order information includes an index indicating whether the modulation order of the interference signal is identical in resources allocated to the UE.

10. The user equipment of claim 8, wherein the modulation order information includes an index having a value determined based on a number of consecutive resource blocks over which the modulation order of the interference signal is identical in resources allocated to the UE.

11. The user equipment of claim 8, wherein the modulation order information is received using at least one of upper signaling and physical layer signaling.

12. The user equipment of claim 11, wherein, in the modulation order information, information indicating whether the modulation order of the interference signal is identical in resources allocated to the user equipment is received through physical layer signaling, and information indicating a number of consecutive resource blocks over which the modulation order of the interference signal is identical in the allocated resources is received through upper signaling.

13. The user equipment of claim 8, wherein the modulation order information includes information on a Demodulation Reference Signal (DMRS) of the interference signal and an index indicating that the modulation order of the interference signal is different in units of a predetermined number of resource blocks in resources allocated to the user equipment.

14. The user equipment of claim 13, wherein the controller determines that the modulation order of the interference signal is identical in the resources allocated to the user equipment when the index included in the modulation order information indicates the information on the DMRS of the interference signal.

* * * * *